United States Patent Office 3,522,064
Patented July 28, 1970

3,522,064
STABILIZED ZIRCONIA CONTAINING NIOBIA AND CALCIUM OXIDE
Herbert Valdsaar, Wilmington, Del., assignor to E. I. du Pont de Nemours and Company, Wilmington, Del.
No Drawing. Filed Aug. 21, 1967, Ser. No. 661,844
Int. Cl. C04b 35/48
U.S. Cl. 106—57
5 Claims

ABSTRACT OF THE DISCLOSURE

Zirconia-based refractories are made resistant to thermal shock and of high strength at elevated temperatures by incorporating, by weight, 3 to 10% of calcium oxide, and from 2 to 15% of niobium pentoxide, the total of these added oxides being from 5 to 20% by weight of the refractory.

BACKGROUND OF THE INVENTION

Field of the invention

This invention relates to the manufacture of zirconia-based refractory shapes; and more particularly to the manufacture of zirconia-based refractory shapes which are particularly resistant to thermal shock, and which exhibit exceptionally high strengths at elevated temperatures.

Description of the prior art

Under differing temperature conditions, zirconia ($ZrO_2$) occurs in three different crystalline forms: the monoclinic form is the stable crystal form at temperatures up to about 1000° C.; the tetragonal crystal form exists between about 1000° C. and about 1900° C.; and the cubic crystal form is the stable structure from about 1900° C. to the melting point of $ZrO_2$, i.e. about 2700° C. When zirconia is in the pure state, these crystal configurations are reversible and the phase changes are always accompanied by an undesirable change in volume.

Because of these undesirable volume changes much effort has been devoted to the production of what is termed "stabilized zirconia." To effect stabilization of one or another of the zirconia crystal structures over useful ranges of temperatures, impurities have heretofore been introduced into the zirconia crystal for the purpose of minimizing the crystallographic transformations which take place during heating and cooling.

To date, one of the most effective means of stabilizing a zirconia crystal structure has been the introduction of calcium oxide into the zirconia crystals to form the cubic modification, at least in part. For complete stabilization of zirconia crystal, the amount of calcium oxide to be introduced is reported to be 5.85% by weight, and the product which is formed with the zirconia is named fully-stabilized (cubic) $ZrO_2$. This makes the refractory material useful at the elevated temperatures given above by eliminating the destructive expansion and contraction characteristics during heat cycling up to the melting point. However, even though the addition of calcium oxide does effect crystallographic stability, the refractory materials which are formed are deficient in other properties desirable for applications at high temperatures. In particular, the calcium oxide-stabilized refractories have often lacked high strength at elevated temperatures, a property necessary for such applications as furnace linings. Also, the resistance of these prior art materials to thermal shock has not been good, allowing these calcium oxide-stabilized refractories only a short life time for many high temperature applications. Further, the effect of calcium oxide is transitory; after several thermal cycles, stabilization is diminished, possibly because of diffusion of CaO from the interior of the refractory grains to the grain boundaries.

SUMMARY

It has now been found that refractory materials which exhibit exceptionally high strengths at elevated temperatures and resistance to thermal shock may be prepared by the stabilization of zirconia in the cubic crystal form using calcium oxide in combination with niobium pentoxide as refractory additives.

The heating of pure zirconia with specific amounts of calcia (or a compound which will form CaO, such as $CaF_2$ or calcium oxalate) and niobia will effect partial recrystallization of the zirconia from the monoclinic to the cubic form and will stabilize this latter crystal structure. The effect of niobia seems to be particularly beneficial in the grain boundaries of this polycrystalline ceramic. It was observed by electron microprobe analysis that calcium oxide segregates in the grain boundaries to an appreciable extent. This phenomenon was generally noticeable in commercial ceramics, in freshly fired grogs, and to some extent in the ternary calcia-niobia-zirconia compositions. In most cases, silica and alumina, which occur as impurities in zirconia, can be found in grain boundaries accumulated together with calcia. Niobia, if present in the composition, follows the same trend and to some extent accompanies calcia in the grain boundaries; however, some of the niobia remains with calcia within the grains and thereby assists in the stabilization of $ZrO_2$ in the cubic structure.

Common impurities, notably $Fe_2O_3$ and $TiO_2$, do not have such a pronounced trend for grain boundary segregation as the above-mentioned oxides (CaO, $SiO_2$, $Nb_2O_5$, $Al_2O_3$).

Mixing of additional unfired zirconia in an amount of from 1 to 20%, or niobia powder from 1 to 5%, or both of these in a total amount of up to 25% based on the weight of the grog already containing from 3–10% by weight of niobium oxide produces particularly strong refractory bodies. The calcia-niobia-stabilized zirconia refractories of this invention have been shown to exhibit properties superior to those materials known in the prior art which employ calcium oxide alone as a stabilizing material for zirconia.

DESCRIPTION OF THE PREFERRED EMBODIMENTS

In general, the refractory materials which are the product of this invention have been prepared by methods well known in the art for the preparation of refractory shapes. The steps include the blending of the raw materials, compacting the blend of materials with or without the addition of the binder, firing the mix for the preparation of grog, grinding and sizing the grog, mixing the grog with additional reactants and binders, compacting the mix comprising the grog to form the desired refractory shape, and finally, firing the refractory shape. The following discussion will describe the method by which each of these steps has been carried out to produce the zirconia-based refractories of the present invention.

Blending the raw materials

The raw materials used in carrying out the processes of this invention are zirconia, calcium oxide, preferably in the form of $CaCO_3$, and niobium pentoxide. Each of these materials is used in a relatively pure form, and in fine particle sizes of 0.1 to 2 microns, with the calcium oxide preferably being formed in situ from calcium carbonate when the mix of raw materials is fired. The three raw materials are blended by dry rolling or by wet rolling in any commercial blender.

Compaction of the blend

The blend of raw materials thus prepared can, if desired, be treated with a binder such as glycerol, starch, gum arabic, dextrin in water, or rubber cement in a solvent such as, for example, $C_2Cl_4$. The blend of raw materials, with or without the addition of a binder, is formed into compacts of a convenient size using a pressure of from about 5000 to about 15,000 p.s.i. Larger compacts have been prepared by impact pressing using a press rated at 300 lbs. total pressure.

Firing the mix

The compacted mix thus prepared is fired at a temperature of about 1600° C. to about 2000° C. for a period of about 3 to 24 hours. The usual method of firing is to raise the temperature at a rate of about 100° C. per hour from room temperature to the desired firing temperature in the case of large compacts; and at a faster rate of up to 400° C. per hour for the smaller compacts. The desired firing temperature is maintained for the designated period of time and the fired compact is cooled in the furnace. If a temperature in the lower part of the temperature range is used, the longer firing time will be required; and, conversely, the higher temperatures require shorter firing times. Usual firing conditions have been about 8 hours if the temperature is 1600° C., or about 3 hours if the maximum temperature of 2000° C. is used.

Grinding and sizing the fired mix

The grog resulting from the above-described firing step is crushed in a jaw-crusher, and, if necessary, is further size-reduced by ball milling. The grog is preferably then screen-sized, four size fractions being obtained as follows: —10 plus 20; —20 plus 50; —50 plus 100; —100 (U.S. Standard Sieve Sizes).

Grog mix for final firing

For the preparation of the refractory in its final desired shape, selected particle size fractions of the fired grog are mixed together and compacted in the presence of moisture or an organic binder such as rubber cement, dextrine or epoxy resin.

If desired, some unfired, pure monoclinic zirconia powder may be added to the grog. Also, some advantages have been found for including at this point in the process some additional unfired pure niobia powder. In some cases, inorganic compounds volatile at the temperatures of firing, such as alkali hydroxides, alkali carbonates, and sodium phosphate, have been used as binders, in the presence of a little moisture.

Compaction of the refractory mix

Compaction of the grog, with the additional reactants if these have been added, is carried out in the same manner as given above for the compaction of the raw materials. The preferred condition for the compaction of the mix in small shapes is compaction under pressure of 15,000 p.s.i. However, the material can be compacted at pressures from 500 to 120,000 p.s.i. if desired. If larger compacts are to be prepared, impact pressing may be employed.

Final firing

The final firing of the refractory shapes is carried out at a temperature preferably higher than 1700° C., and higher than that used for the first firing to form the grog. The temperature range for this final firing can be from about 1700° C. to about 2100° C. Firing at the higher temperature improves the strength of the piece. The time for firing is from about 2 hours to about 5 hours, the usual time being about 3 hours. The refractory shapes thus prepared are allowed to cool in the furnace in air.

To carry out the foregoing general steps in the processes of this invention, the following conditions have been found preferable.

The raw materials which have been found best suited for preparation of the refractory shapes of this invention should be relatively pure, in fine particle sizes. The zirconium oxide is preferably a finely-ground or precipitated powder of —325 mesh size. The calcium oxide is preferably obtained by the decomposition, in situ, of calcium carbonate. For this purpose any commercially available, relatively pure calcium carbonate may be used. If it is found to be more convenient, calcium oxide, or $CaF_2$ or calcium oxalate can be used. Any commercially available, pure (but not necessarily tantalum-free) niobium oxide can be used, but this should be in a finely ground (—325 mesh) form.

These materials are either dry-blended, or mixed and wet blended and the blend oven-dried at 100–110° C. to form an easily-crushed solid which will not powder.

The dry powder mix or dried blend of powders is then compacted. For experimental purposes a cylinder 2″ x 2″ was found to be a convenient size, and these cylinders were fired either in a gas-fired furnace at 1600° C. for about 8 to 24 hours, or in a gas-fired furnace with oxygen enrichment at a temperature of about 1700° C. to 2000° C.

The fired compacts are either cooled in the furnace, or removed and cooled in air if desired. These compacts are then crushed and screened to give at least the four size fractions described above.

After the grog has been prepared, it can be used as such, or it can be blended with additional zirconia or niobia powder of the same type as was used in the grog preparation, or with other additives. The percentages of the various size fractions of grog which are used for the preparation of the final refractory shape will vary, and the strength of the final refractory product will, to a certain extent, be dependent upon the formulation of the refractory mix for this final firing. Although the desired compositional mixes will be described in detail in the examples, it is not the purpose of this invention to determine the compositional mix of varying size fractions of grog which will produce the maximum strength in any particular final product. This can readily be determined experimentally in each case from the refractory art.

In most cases, it has been found convenient to include an organic binder in the grog mix, in order to facilitate handling of materials during the compaction step. Compaction of the grog mix is carried out under conditions similar to those described above. A pressure of 15,000 p.s.i. is found convenient and preferable.

The final firing of the refractory shape is carried out in the type of furnace described above, preferably for a period of three hours at a temperature of from 1700° C. to 2100° C.

For the formation of the grog, the preferable composition is, by weight, from about 3 to about 10% calcium oxide, or the narrower range of 4 to 7% calcium oxide, preferably added as calcium carbonate; from about 2 to about 15% niobium pentoxide; and the remainder zirconia. The total of these added oxides is 5 to 20% by weight of the refractory. For the preparation of the final refractory shapes it has been found preferable in many cases to add from 1 to 20% by weight of zirconia, either alone or along with from 1 to 5% of niobia, based on the weight of the ground and sized grog. The zirconia and niobia which are used in the preparation of the final refractory mix are of the same type as those used for the formation of the grog. In other cases, however, particularly with larger shapes, the addition of unfired $ZrO_2$ to the grog was avoided in order to minimize shrinkage upon firing.

The shape which has been found most convenient for experimental testing in the development of this invention, is a standard bar 4½″ x ⅝″ x ½″.

Densities

The densities of the fired samples depend on the grog mixture used, on the compaction pressure of the final shape, and on the top temperature of the firing, in a manner which will be apparent from the examples given hereinbelow.

The bulk density of most small samples was 4.9 to 5.2 g./cm.³, the porosity ranging from 5 to 20 percent. The apparent density of most samples was about 5.6 g./cm.³. The density of large pieces, exceeding 8″ in at least one dimension, and compacted under the impact press (rated at 300 lbs. air pressure) was about 4.4–4.7 g./cm.³.

Crystalline structure

The crystalline structure of the typical composition (5.9 weight percent CaO, 5.2 weight percent $Nb_2O_5$, balance commercial $ZrO_2$) as grog, or as the final shape prepared from this grog, was predominantly cubic. The remainder (10 to 20 weight percent) was monoclinic zirconia.

As determined by high temperature X-ray diffraction, the mono-clinic fraction started to convert to the tetragonal form at about 800° C. and this conversion was complete at 1200° C. Upon cooling, the reverse conversion, i.e. from tetragonal to monoclinic, took place. The cubic fraction remained unchanged through the heating and cooling cycles.

Testing of samples

Refractory bars prepared by processes described above were subjected to a standard test known as the modulus of rupture determination. The strength of a bar is determined as the maximum load before breaking, when a brick acts as a beam supported at both ends. The standard formula for calculation of modulus of rupture is:

Modulus of Rupture (p.s.i.)
$$= \frac{3 \text{ load (in pounds)} \times \text{span (in inches)}}{2 \text{ width (in inches)} \times \text{thickness (in inches)}^2}$$

Specimens prepared according to this process have been tested for modulus of rupture up to and including a temperature of 1500° C.

EXAMPLES

The following examples illustrate in detail the processes and refractory products of this invention.

Example 1

For the preparation of calcia-niobia-stabilized zirconia refractory bars of this example, a batch of 1000 grams of grog was prepared according to the following procedure:

100 grams $CaCO_3$, 50 grams $Nb_2O_5$, and 850 grams $ZrO_2$ were slurried with water and thoroughly blended in a commercial high speed blender. The water was then separated by filtration and the moist paste was spread in a tray and oven-dried at 110° C. This dried material was broken up and compacted with the addition of an organic binder. The compacts were heated in a gas-fired furnace, the temperature being increased from room temperature to 1600° C. at the rate of 100° C. per hour. When the temperature of 1600° C. had been attained, this temperature was maintained for an 8-hour period, and the refractory material was cooled in the furnace.

The grog thus prepared was size-reduced in the jaw crusher and further size-reduced by rolling in a rubber-lined ball mill with zirconia pebbles. This material was divided into four size fractions: −10/+20, −20/+50, −50/+100, and −100 mesh sizes (U.S. Standard Sieve Scale).

The mix for the preparation of the bars for final firing consisted of, by weight, 50% of the −50 +100 mesh particle size fraction of grog, 40% of the −100 mesh particle size fraction, and 10% of unfired zirconia powder of the same batch as was used in the preparation of the grog. These powders were mixed with sufficient organic binder to make possible the fabrication of bars 1¼″ long and ½″ x ⅜″ in cross section and each weighing about 20 grams. These bars were formed by compaction under pressure of about 60,000 p.s.i.

The test bars were fired at a maximum temperature of 2000° C. in a gas-oxygen fired furnace, the maximum temperature of 2000° C. being maintained for 3 hours. The rate of heat-up was 400° C. per hour. The refractory shapes thus prepared were cooled inside the furnace. Two of the bars were tested for modulus-of-rupture by a test involving having the bar act as a beam supported at both ends, i.e., the standard modulus-of-rupture test procedure. When tested at 1500° C., these two samples broke at 10,800 p.s.i. and 9,640 p.s.i. respectively. (See Samples A and B, Table 1, following Example 6 hereinbelow.)

The broken pieces resulting from the modulus of rupture test, each about ¾″ long, were tested for resistance to thermal shock by cycling 50 times between 1200° C. and 25° C. (air quenching), the total time at 1200° C. being 500 hours. The pieces showed no deterioration with these cycling tests, and remained free of cracks.

A test bar prepared from the same grog, but with a different ratio of size fractions and without the addition of unfired $ZrO_2$ powder (Sample C in the Table 1), tested for modulus-of-rupture in the same manner as above, broke at 6,540 p.s.i.

Example 2

Uusing the same grog as in Example 1, the following size fractions were chosen for the preparation of a standard mixture:

Percent by weight: Mesh
50 ------------------------------- −20/+50
10 ------------------------------- −50/+100
30 ------------------------------- −100
10, unfired $ZrO_2$ powder.

To separate portions of this standard mixture, various inorganic additives as listed in Table 1 were added before compaction into 1¼″ x ½″ x ⅜″ shapes under 60,000 p.s.i.

Samples D and E, with 2% and 1% additional niobia powder, were fired at 2100° C. for 2 hours. The rupture tests made at 1500° C. yielded the values 15,600 p.s.i. and 6,440 p.s.i. respectively. As will be noted from the data assembled in Table 1 hereinafter, Sample D exhibits the highest modulus of rupture (15,600 p.s.i.) of all refractories tested; as can be determined from the data in that table, Sample D has a calcium oxide content of 5.3% and a niobium pentoxide content of 6.5%.

A 4½″ long bar, of the same composition as Sample D (and fired beside it at 2100° C. for 2 hours) withstood 50 air quenchings from 1200° C. and 800 hour exposure at 1200° C., and still remained unbreakable by hand. The compaction pressure for this bar was 15,000 p.s.i.

Other samples (see H, I, J, K, L in Table 1) received additions of alkali hydroxide, alkali carbonates, and alkali phosphates and after compaction under 60,000 p.s.i., were fired at 2000° C. for three hours. The respective rupture strength values at 1500° C. were between 5000 and 7800 p.s.i.

Example 3

Using portions of the same raw materials, grog was prepared as for Example 1, except that the firing conditions were 1725° C. for three hours. Test bars were prepared according to the following procedure:

A mixture was prepared as follows:

Of the grog: 50% by weight of −20/+50 mesh fraction, 10% by weight of −50/+100 particle size fraction, 30% by weight of −100 mesh particle size fraction and 10% by weight of unfired zirconia powder of the same batch as used in preparation of the grog.

After dry blending, this mix was slurried with binder to form a paste and compacts each weighing 20 grams and of dimension 1¼″ x ½″ x ⅜″ were formed under pressure of 60,000 p.s.i.

The test bars thus formed were placed in a gas-oxygen fired furnace and the temperature was raised from room temperature to 2100° C. at the rate of 400° C. per hour. The maximum temperature of 2100° C. was maintained for 2 hours.

The bars were cooled in the furnace and were tested as given above for modulus of rupture. Duplicate bars were fuond to withstand loads of 4940 p.s.i. and 5860 p.s.i. at 1500° C. (See Samples F and G, Table 1.) Bars of similar composition to these bars, measuring 4½″ x ⅝″ x ½″, were prepared and were tested for thermal shock by heating to 1200° C. Furthermore, 3 intermittent heatings were made to a temperature of 2000° C. with subsequent cooling to room temperature. After this severe shock testing, the bars showed no visible deterioration whatever.

Example 4

Using portions of the same raw materials, additional grog was prepared according to the procedure given in Example 1 except that the blend of materials was fired at 1600° C. for 1 hour rather than for 8 hours. After grinding and separating into size fractions, a blend was prepared of 50% by weight of −20/+50 mesh fraction, 10% by weight of the −50%/+100 mesh fraction, 20% by weight of −100 mesh fraction, and 20% by weight of additional unfired zirconia powder of the same batch as was used in the preparation of the grog. One bar, 4½″ x ⅝″ x ½″, was prepared by compacting portions of this blended mix, using rubber cement as a binder, under pressure of approximately 15,000 p.s.i. This bar was fired as in the examples given above, but at a maximum temperature of 2100° C. for 2 hours.

This bar was tested according to the following procedure: the bar was exposed for 500 hours to a temperature of 1200° C. and subjected intermittently to 50 heat shock treatments by cooling in air from 1200° C. to room temperature, reheating, and recooling. Included in the testing were five reheats to 2000° C., with subsequent cooling to room-temperature. After these severe heat-shock tests, duplicate samples (1¼″ long pieces) were cut from this bar and these were found to withstand 4600 p.s.i. and 3260 p.s.i. in the modulus of rupture tests at 1500° C. (See Samples R and S, Table 1.)

Example 5

Using the same procedures for the preparation of refractory bars as is given in Examples 1 through 4 but with compositional variations and with varying heating schedules as indicated in Table 1, other samples, T, U, V, W, X, Y, and Z were prepared and tested. It will be evident from the results shown in Table 1 that the calcia-niobia-stabilized zirconia refractories prepared according to the process of this invention are far superior to comparable present day, commercially available refractory materials.

Using other conditions of final firing, additional specimens were prepared and tested. (See Samples M, N and P, Table 1.)

Control samples comprising commercial refractories were tested in the same manner as the experimental samples and the results of these tests are given in Table 2, hereinbelow. In thermal shock tests, no commercial samples withstood the thermal cycling as did, for example, the new compositions D and R.

Example 6

Using the same powders in the same proportions as described in Example 1, nine-pound quantities were wet-mixed in a large commercial high-speed blender, dried, and combined with one weight percent dextrine, and compacted with an impact press (rated at 300 pounds total pressure) for one minute. The resultant dobies, 8½″ x 4½″ x 2″, weighing about 9 lbs. each were loaded into a gas-fired furance and heated to 1600–1650° C. for 16 hours.

The dobies were then crushed in a jaw crusher and the crushed product graded according to the size.

The following mixture was prepared:

Size: Percent by wt.
  8/20 mesh _____ 23
  20/50 mesh _____ 25
  50/100 mesh _____ 13
  −100 mesh _____ 30
  $ZrO_2$ powder, unfired _____ 9

The grog was mixed with organic binders, in this case with 3% by weight of epoxy resin with diethanolamine in acetone solution. This particular mixture was compacted in the same mold and the same impact press mentioned above. The resin hardened at 60° C. and formed a firm brick, density 4.3 g./cc., which was fired at 1650° C. for 12 hrs. A good shape resulted, free of cracks. The bulk density after firing was 4.6 g./cc., linear shrinkage about 1.5%.

Results obtained with the above-mentioned examples are shown in Tables 1 and 2, below:

TABLE 1.—TRANSVERSE BREAKING STRENGTH OF $CaO-Nb_2O_5-ZrO_2$ REFRACTORIES AT 1,500° C.

| Sample | Grog composition, weight percent | | | Top firing temperature (° C.) | Time at top temp. (hrs.) | Grog size distribution for final firing (weight percent) | | | | Inorganic additive to the grog | Top firing temperature (° C.) | Time at top temp. (hrs.) | Modulus of rupture at 1,500° C. (p.s.i.) |
|---|---|---|---|---|---|---|---|---|---|---|---|---|---|
| | CaO | $Nb_2O_5$ | $ZrO_2$ | | | −20/+50 | 50/+100 | −100 | Unfired $ZrO_2$ powder | | | | |
| A,B | 5.9 | 5.2 | Balance | 1,600 | 8 | None | 50 | 40 | 10 | None | 2,000 | 3 | 10,800; 9,640 |
| C | 5.9 | 5.2 | do | 1,600 | 8 | 50 | 10 | 30 | None | do | 2,000 | 3 | 6,540 |
| D | 5.9 | 5.2 | do | 1,600 | 8 | 50 | 10 | 30 | 10 | 2% $Nb_2O_5$ | 2,100 | 2 | 15,660 |
| E | 5.9 | 5.2 | do | 1,600 | 8 | 50 | 10 | 30 | 10 | 1% $Nb_2O_5$ | 2,100 | 2 | 6,440 |
| F,G | 5.9 | 5.2 | do | 1,725 | 3 | 50 | 10 | 30 | 10 | None | 2,100 | 2 | 5,860; 4,940 |
| H | 5.9 | 5.2 | do | 1,600 | 8 | 50 | 10 | 30 | 10 | 1% NaOH | 2,000 | 3 | 7,340 |
| I | 5.9 | 5.2 | do | 1,600 | 8 | 50 | 10 | 30 | 10 | 1% $Na_2CO_3$ | 2,000 | 3 | 7,230 |
| J | 5.9 | 5.2 | do | 1,600 | 8 | 50 | 10 | 30 | 10 | 1% $Li_2CO_3$ | 2,000 | 3 | 7,810 |
| K | 5.9 | 5.2 | do | 1,600 | 8 | 50 | 10 | 30 | 10 | 2% $Na_3PO_4$ | 2,000 | 3 | 6,040 |
| L | 5.9 | 5.2 | do | 1,600 | 8 | 50 | 10 | 30 | 10 | 2% $Na_2HPO_4$ | 2,000 | 3 | 5,000 |
| M,N | 5.9 | 5.2 | do | 1,600 | 8 | 50 | 10 | 30 | 10 | None | 1,850 | 5 | 5,020; 4,560 |
| P | 5.9 | 5.2 | do | 1,600 | 8 | None | 50 | 40 | 10 | do | 1,850 | 3 | 5,550 |
| R,S [1] | 5.9 | 5.2 | do | 1,600 | 1 | 50 | 10 | 20 | 20 | do | 2,100 | 2 | 4,600; 3,260 |
| U | 5.9 | 3.0 | do | 1,650 | 3 | 50 | 10 | 30 | 10 | do | 2,000 | 3 | 4,000 |
| T,V | 4.0 | 5.0 | do | 1,600 | 3 | 50 | 10 | 30 | 10 | do | 2,100 | 2 | 3,270; 3,030 |
| W,X | 5.9 | 10.4 | do | 1,650 | 2 | None | 10 | 30 | None | do | 2,100 | 2 | 3,240; 2,950 |
| Z,Y | 5.9 | 10.4 | do | 1,650 | 2 | 50 | 10 | 30 | 10 | do | 2,100 | 2 | 2,130; 2,110 |

[1] These samples were cut from a 4″ long bar which had been exposed to 50 air-quenchings from 1,200° C. with concurrent soaking at 1,200° C. for 500 hours.

TABLE 2

Transverse breaking strength of commercial zirconia refractories at 1500° C.

Modulus of rupture, p.s.i.
Bars cut from standard dense $ZrO_2$ brick (CaO stabilized commercial product) (duplicate samples, ⅝″ x ¾″ cross-section) _____ 31; 79
Same material as above, but heated to 2000° C. for 3 hours before testing (three samples) _____ 313; 792; 867
"Special dense" $ZrO_2$ bars (commercial product) (bar ⅝″ x ⅝″ in cross-section) _____ 1900

TABLE 2.—Continued

| | Modulus of rupture, p.s.i. |
|---|---|
| $Y_2O_3$—stabilized $ZrO_2$ (commercial product) (¾" x ¾" cross-section—duplicate samples) | 320; 350 |

I claim:

1. A refractory comprising a major amount of zirconia and 3 to 10% calcium oxide and 2 to 15% niobium pentoxide, the total amount of calcium oxide plus niobium pentoxide being of from five to 20% by weight of the total refractory.

2. A refractory comprising a major amount of zirconia which exhibits high strength at elevated temperatures and which is resistant to thermal shock, comprising 5.3% calcium oxide and 6.5% niobium pentoxide based on the total weight of the refractory, and the balance being commercial zirconia.

3. In a process for the preparation of a zirconia-containing refractory body which exhibits high strength at elevated temperatures and is resistant to thermal shock, the steps comprising (1) preparing a grog comprising a major amount of zirconia and both calcium oxide in an amount of from 3 to 10% and niobium pentoxide in an amount from 2-15% by weight of the grog, the amount of calcium oxide plus niobium oxide in said grog being from 5-20% by weight; (2) grinding and sizing said grog; (3) preparing a mixture of said ground and sized grog and 1 to 20% of unfired commercial zirconia based on the weight of the grog used; (4) compacting into a desired shaped body the mixture of step 3; and (5) firing said body at a temperature of from about 1700° C. to 2100° C. for from 2 to about 5 hours.

4. In a process for the preparation of a zirconia-containing refractory body which exhibits high strength at elevated temperatures and is resistant to thermal shock, the steps comprising (1) preparing a grog comprising a major amount of zirconia and both calcium oxide in an amount of from 3 to 10% and niobium pentoxide in an amount from 2 to 15% by weight of the grog, the amount of calcium oxide plus niobium oxide in said grog being from 5 to 20% by weight; (2) grinding and sizing said grog; (3) preparing a mixture of said ground and sized grog and 1 to 5% by weight of niobium pentoxide, based on the weight of the grog used; (4) compacting into a desired shaped body a mixture of step 3; and (5) firing said shape at a temperature of from about 1700° C. to 2100° C. for from 2 to about 5 hours.

5. A process of claim 3 in which said mixture of step 3 includes, by weight, both from 1 to 20% unfired commercial zirconia and from 1 to 5% niobium pentoxide, based on the weight of the grog used.

References Cited

UNITED STATES PATENTS

| 2,910,371 | 10/1959 | Ryschkewitsch | 106—57 |
| 2,937,102 | 5/1960 | Wagner | 106—57 |
| 3,222,148 | 12/1965 | Hay | 106—57 |
| 3,268,349 | 8/1966 | Brixner | 106—57 |
| 3,350,230 | 10/1967 | Tannenberger et al. | 106—57 |

JAMES E. POER, Primary Examiner